US008986637B2

(12) United States Patent
Fisher et al.

(10) Patent No.: US 8,986,637 B2
(45) Date of Patent: Mar. 24, 2015

(54) BIMETALLIC CATALYST

(71) Applicant: Johnson Matthey Public Limited Company, London (GB)

(72) Inventors: Janet Mary Fisher, Reading (GB); David Thompsett, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/072,942

(22) Filed: Nov. 6, 2013

(65) Prior Publication Data

US 2014/0154160 A1 Jun. 5, 2014

Related U.S. Application Data

(60) Provisional application No. 61/754,696, filed on Jan. 21, 2013.

(30) Foreign Application Priority Data

Nov. 30, 2012 (GB) .................................. 1221547.1

(51) Int. Cl.
| | | |
|---|---|---|
| B01D 53/56 | (2006.01) |
| B01D 53/94 | (2006.01) |
| B01J 8/02 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |
| C01G 28/00 | (2006.01) |
| C01G 30/00 | (2006.01) |
| B01J 29/00 | (2006.01) |
| B01J 29/04 | (2006.01) |
| B01J 29/06 | (2006.01) |
| B01J 21/00 | (2006.01) |
| B01J 21/04 | (2006.01) |
| B01J 23/00 | (2006.01) |

(Continued)

(52) U.S. Cl.
CPC .............. *F01N 3/2803* (2013.01); *B01D 53/94* (2013.01); *B01J 23/66* (2013.01); *B01J 23/52* (2013.01); *B01D 53/944* (2013.01); *B01D 2255/1021* (2013.01); *B01D 2255/1025* (2013.01); *B01D 2255/1026* (2013.01); *B01D 2255/106* (2013.01); *B01D 2255/2042* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/20707* (2013.01); *B01D 2255/20715* (2013.01); *B01D 2255/2073* (2013.01); *B01D 2255/20738* (2013.01); *B01D 2255/20746* (2013.01); *B01D 2255/20753* (2013.01); *B01D 2255/20761* (2013.01); *B01D 2255/2094* (2013.01)
USPC ............ 423/213.5; 422/180; 60/299; 502/66; 502/74; 502/87; 502/243; 502/244; 502/245; 502/259; 502/261; 502/262; 502/263; 502/302; 502/303; 502/304; 502/326; 502/327; 502/330; 502/331; 502/332; 502/333; 502/334; 502/335; 502/336; 502/337; 502/338; 502/339; 502/349; 502/355; 502/439

(58) Field of Classification Search
CPC .......... B01J 21/04; B01J 21/066; B01J 21/08; B01J 21/12; B01J 23/40; B01J 23/42; B01J 23/44; B01J 23/462; B01J 23/464; B01J 23/52; B01J 23/66; B01J 23/70; B01J 23/72; B01J 23/755; B01J 29/0325; B01J 29/0333; B01J 29/043; B01J 29/044; B01J 29/0354; B01J 29/0356; B01J 29/068; B01J 29/072
USPC ....................... 502/66, 74, 87, 243–245, 259, 502/261–263, 302–304, 326, 327, 330–339, 502/349, 355, 439; 423/213.5; 422/180; 60/299
See application file for complete search history.

(56) References Cited

U.S. PATENT DOCUMENTS 3,156,735 A * 11/1964 Armstrong .................... 585/624
5,473,887 A 12/1995 Takeshima et al.
(Continued)

FOREIGN PATENT DOCUMENTS

CN 101380575 A 3/2009
DE 102008003825 A1 7/2009
(Continued)

OTHER PUBLICATIONS

Great Britain Search Report for corresponding Great Britain Patent Application No. GB1221547.1 dated Apr. 23, 2013.
(Continued)

*Primary Examiner* — Cam N. Nguyen
(74) *Attorney, Agent, or Firm* — Kevin M. Carroll

(57) ABSTRACT

An emission control catalyst composition comprising a supported bimetallic catalyst consisting of gold and a metal selected from the group consisting of platinum, rhodium, ruthenium, copper and nickel is disclosed. Also disclosed is a catalytic convertor comprising a substrate monolith coated with the emission control catalyst composition and a lean burn internal combustion engine exhaust gas emission treatment system comprising the catalytic convertor. A variety of processes for preparing the catalyst composition are claimed.

14 Claims, No Drawings

(51) Int. Cl.
*B01J 23/02* (2006.01)
*B01J 23/08* (2006.01)
*B01J 23/10* (2006.01)
*B01J 23/40* (2006.01)
*B01J 23/42* (2006.01)
*B01J 23/44* (2006.01)
*B01J 23/56* (2006.01)
*B01J 23/58* (2006.01)
*B01J 23/72* (2006.01)
*B01J 23/74* (2006.01)
*F01N 3/28* (2006.01)
*B01J 23/66* (2006.01)
*B01J 23/52* (2006.01)

(56) References Cited

U.S. PATENT DOCUMENTS

| | | | | |
|---|---|---|---|---|
| 5,814,112 | A * | 9/1998 | Elliott et al. | 48/197 R |
| 5,925,463 | A * | 7/1999 | Reetz et al. | 428/402 |
| 6,958,138 | B1 * | 10/2005 | Devic | 423/584 |
| 7,326,806 | B2 * | 2/2008 | Hayashi et al. | 560/208 |
| 7,655,137 | B2 * | 2/2010 | Zhou et al. | 208/134 |
| 7,674,744 | B2 * | 3/2010 | Shiratori et al. | 502/327 |
| 7,862,932 | B2 * | 1/2011 | Eguchi et al. | 429/231.6 |
| 8,168,561 | B2 * | 5/2012 | Virkar | 502/326 |
| 8,178,463 | B2 * | 5/2012 | Stamenkovic et al. | 502/101 |
| 8,187,995 | B2 * | 5/2012 | Wakita et al. | 502/304 |
| 8,350,080 | B2 | 1/2013 | Klug et al. | |
| 8,377,841 | B2 * | 2/2013 | Flytzani-Stephanopoulos et al. | 502/304 |
| 8,431,506 | B2 * | 4/2013 | Neltner et al. | 502/7 |
| 8,685,878 | B2 * | 4/2014 | Stamenkovic et al. | 502/101 |
| 2002/0103080 | A1 * | 8/2002 | Choudhary et al. | 502/339 |
| 2003/0012719 | A1 * | 1/2003 | Roos et al. | 423/247 |
| 2006/0210864 | A1 * | 9/2006 | Eguchi et al. | 429/44 |
| 2007/0027341 | A1 * | 2/2007 | Rossi et al. | 562/525 |
| 2011/0306790 | A1 | 12/2011 | Murphy et al. | |
| 2012/0227466 | A1 * | 9/2012 | Medlin et al. | 73/31.06 |
| 2012/0296124 | A1 * | 11/2012 | Asefa et al. | 564/417 |
| 2013/0142726 | A1 * | 6/2013 | Biniwale et al. | 423/651 |
| 2013/0296604 | A1 * | 11/2013 | Alshammari et al. | 562/543 |
| 2013/0331606 | A1 * | 12/2013 | Dias et al. | 562/590 |

FOREIGN PATENT DOCUMENTS

| | | |
|---|---|---|
| EP | 0499402 A1 | 8/1992 |
| EP | 0602602 A1 | 6/1994 |
| EP | 0602865 A1 | 6/1994 |
| EP | 0766993 A2 | 4/1997 |
| EP | 2682206 A1 | 1/2014 |
| FR | 2939329 A3 | 6/2010 |
| GB | 2122912 A | 1/1984 |
| JP | 2012217970 A | 11/2012 |
| WO | 2010090841 A2 | 8/2010 |
| WO | 2012120711 A1 | 9/2012 |
| WO | 2012160708 A1 | 11/2012 |

OTHER PUBLICATIONS

Great Britain Search Report for corresponding Great Britain Patent Application No. GB1319561.5 dated Jan. 7, 2014.
PCT Search Report for corresponding PCT Patent Application No. PCT/GB2013/052895 dated Jan. 27, 2014.

* cited by examiner

BIMETALLIC CATALYST

CROSS REFERENCE TO RELATED APPLICATIONS

This application claims priority benefit to Great Britain Patent Application No. 1221547.1 filed on Nov. 30, 2012 and to U.S. Provisional Patent Application No. 61/754,696 filed on Jan. 21, 2013, both of which are incorporated herein by reference.

FIELD OF THE INVENTION

The present invention relates to an oxidation catalyst composition for controlling emissions and to processes for its preparation. The invention further relates to a catalytic convertor comprising the oxidation catalyst and to an exhaust gas emission treatment system for a lean burn combustion engine. The invention also relates to an apparatus comprising the exhaust gas emission treatment system and to a vehicle that includes such an apparatus.

BACKGROUND TO THE INVENTION

The combustion process in the internal combustion engine of a vehicle is never perfect. Harmful emissions that result from the incomplete combustion are carbon monoxide, unburned hydrocarbons and $NO_x$. There are existing and future emission standards for such gaseous emissions. Carbon monoxide and hydrocarbons are typically removed from the exhaust gas of the internal combustion engine by use of an oxidation catalyst as part of a catalytic convertor. In simple terms a catalytic convertor needs to provide a structure that exposes a maximum surface area of catalyst to the exhaust gas stream and the catalyst needs to aid the reaction of the carbon monoxide and hydrocarbons with oxygen in the exhaust gas stream. In this structure the harmful gases are converted into what are considered less harmful materials i.e. carbon dioxide and water.

Carbon dioxide itself is one of the main gaseous emissions from the combustion process within an internal combustion engine, when complete combustion occurs. It is considered by many in the scientific community to be a major factor in global warming as a result of increase of greenhouse effect due to its emissions. Currently in Europe there are no mandatory emission standards for carbon dioxide emitted from passenger cars, but voluntary agreements with motor manufacturers are in place. In the UK financial measures have been introduced in 2001 in an attempt to lower carbon dioxide emissions by linking vehicle excise duty to carbon dioxide emission levels and type of fuel used. Therefore passenger car buyers pay lower annual vehicle excise duty for vehicles that emit lower levels of carbon dioxide.

However the European Union has now agreed a mandatory carbon dioxide target for passenger car manufacturers. Under this legislation car manufacturers have a fleet average emissions target for vehicles sold in Europe of 130 $gCO_2$/Km or below by 2015. This target is being gradually phased in from 2012. The US also recognises that the running of vehicles provides a major source of carbon dioxide emissions. Greenhouse Gas (GHG) emission standards have been set by the Environmental Protection Agency (EPA) and National Highway Traffic Safety Administration (NHTSA). These reductions are being phased in from 2009 to 2016 and are defined in terms of $CO_2$— equivalents ($gCO_2$/mile) whereby emissions of $N_2O$ and $CH_4$ are included with multiplying factors of 296 and 23 respectively. Therefore car manufacturers are striving to lower their carbon dioxide emissions by a variety of measures such as weight reduction, variable valve actuation, low friction components and stop-start technologies. By adopting such measures a reduction in $CO_2$ emissions of 25-30% is reportedly achievable. Many of these measures will also lead to a reduction in the exhaust gas temperature because of the improved fuel efficiency.

Although there have been moves across the world to reduce the level of sulphur present in diesel fuel (currently the mandatory level in Europe is 10 ppm) sulphur poisoning of exhaust gas catalyst systems is still an issue. For example ceria (cerium dioxide), which can be used as a support and/or catalyst promoter, is known to be thermally stable but it is susceptible to sulphur poisoning. Palladium is also well known for its ability to readily react with sulphur dioxide to form a stable sulphate. One way of removing sulphur from the catalyst is regeneration at higher temperatures in order to decompose catalyst metal sulphates that may have formed. This is becoming increasingly more difficult as many of the above measures for reduction in $CO_2$ emission will also lead to a reduction in the exhaust gas temperature. For example the decomposition of palladium sulphate in a lean environment requires temperatures in excess of 700° C. or lower temperatures in rich fuel gas exhaust but then there is a fuel penalty because of the creation of the rich environment.

The catalytic activity of a convertor, i.e. its ability to react with exhaust emissions, is very low at vehicle start up because the catalyst must be heated to its light off temperature before it is fully active. For carbon monoxide and hydrocarbons the light off temperature is recognised as the temperature at which carbon monoxide or hydrocarbon conversion efficiency reaches 50%. Therefore it is important to have as low a light off temperature as possible. For some systems the process of heating to the light off temperature can take up to a couple of minutes. Close coupled catalysts have been employed upstream of the catalytic convertor and hence closer to the exhaust emission to remedy this problem as the close coupled catalyst can reach its light off temperature in seconds. However there are some disadvantages to this approach as close coupled catalysts are thought to be less effective at converting the harmful gases and may be more susceptible to poisoning from exhaust contaminants.

The cost of the catalyst must be minimised, for example by using less materials and/or using less expensive materials. Catalysts that have been used most successfully for oxidation reactions in catalytic convertors are precious metals, particularly platinum, which is a very expensive material. Palladium has been combined with platinum to reduce the catalyst costs and also has been found to reduce sintering of the platinum at higher temperatures. However palladium itself is known to have lower reactivity under very oxidising (lean oxidising) conditions relative to platinum. Unlike platinum, which has a higher ionisation potential and lower oxide stability, palladium exists mostly as an oxide with low specific activity for the oxidation of carbon monoxide and hydrocarbons. Furthermore, as discussed above, palladium is also known for its ability to react with sulphur dioxide, present in diesel exhaust gases, to form a stable sulphate which requires high temperatures to decompose.

Gold is a precious metal, which depending on the prevailing economic situation can be cheaper than platinum. Gold has been combined with palladium to provide an engine exhaust catalyst. WO2010/090841 A1 discloses a palladium gold catalyst which is supported on alumina.

EP 0602865 A1 discloses noble metal-metal oxide catalysts prepared by co-precipitation and their use to catalyse the oxidation of carbon monoxide and hydrocarbons in internal combustion engine exhaust gas. The metal oxide comprises one or more of ceria, zirconia, titania or stannic oxide, ceria being especially preferred. Noble metals disclosed include one or more of ruthenium, rhodium, palladium, osmium, iridium, platinum and gold.

SUMMARY OF THE INVENTION

We have now identified a family of supported bimetallic catalysts that have low light off temperatures for conversion of carbon monoxide (CO) and hydrocarbons (HC) and have the ability to be readily desulphated without adversely affecting the carbon monoxide and hydrocarbon conversion rate.

The invention provides an oxidation catalyst composition for controlling emissions, which composition comprises a support and a bimetallic catalyst consisting of gold and a second metal selected from the group consisting of platinum, rhodium, ruthenium, copper and nickel, and wherein the bimetallic catalyst is supported on the support.

A catalytic convertor is further provided, which comprises a substrate monolith coated with an oxidation catalyst composition of the invention.

A further aspect of the invention relates to an exhaust gas emission treatment system for a lean burn combustion engine, which system comprises the catalytic convertor. In another aspect, the invention provides an apparatus comprising a lean burn combustion engine and the exhaust gas emission treatment system.

Another aspect of the invention provides a vehicle comprising an apparatus of the invention, and wherein the lean burn combustion engine is a lean burn internal combustion engine.

The invention further relates to a process for preparing an oxidation catalyst composition of the invention. In general, the process comprises the steps of (a) preparing a first solution comprising gold, (b) preparing a second solution comprising a second metal selected from the group consisting of platinum, rhodium, ruthenium, copper and nickel, and (c) applying the first solution and the second solution (e.g. simultaneously, concurrently, separately, or sequentially) to a support. Steps (a) to (c) can be performed in any order, except that a particular solution must be prepared before it is applied to the support. When the first solution and second solution are applied separately or sequentially, then the first solution may be applied before the second solution or the second solution may be applied before the first solution.

In the process of the invention, the order of preparation of the first and second solutions is unimportant. The first and second solution may, typically, be the same solution. When the first and second solutions are the same, then steps (a) and (b) are a step of preparing a solution comprising gold and a second metal selected from the group consisting of platinum, rhodium, ruthenium, copper and nickel.

The invention further provides a method of treating carbon monoxide (CO), and optionally hydrocarbons (HCs) and/or nitrogen oxides ($NO_x$), in an exhaust gas from a lean burn combustion engine, which method comprises passing the exhaust gas over an oxidation catalyst composition of the invention, or through a catalytic convertor or an exhaust gas emission treatment system of the invention.

A further aspect of the invention relates to the use of an oxidation catalyst composition or a catalytic convertor of the invention for treating carbon monoxide (CO), and optionally hydrocarbons (HCs) and/or nitrogen oxides ($NO_x$), in an exhaust gas from a lean burn combustion engine.

DETAILED DESCRIPTION OF THE INVENTION

Typically, the oxidation catalyst composition comprises an atomic ratio of the second metal to gold of from 100:1 to 1:100. It is preferred that the atomic ratio of the second metal to gold is from 95:5 to 5:95, more preferably from 95:5 to 25:75.

In general, the oxidation catalyst composition comprises a total amount (in weight %) of the second metal and gold of from 0.1 to 10%. Preferably, the total amount of the second metal and gold is from 0.5 to 10 wt %, such as 1 to 5 wt %.

In general, the second metal is selected from the group consisting of platinum, rhodium, ruthenium, copper and nickel. It is preferred that the second metal is selected from the group consisting of platinum, rhodium and ruthenium. The second metal may be platinum. The second metal may be rhodium. The second metal may be ruthenium. It is preferred that the second metal is platinum.

During use, the gold and second metal are believed to come into close contact and may form an alloy. It is thought that the presence of gold enhances the metallic character of the second metal in the oxidising conditions of the catalytic convertor.

The oxidation catalyst composition of the invention comprises a support. Normally, the material used as a support is selected for its surface area (typically this is relatively high), its thermal durability and its chemical stability.

Typically, the support is a metal oxide support comprising a non-reducible metal oxide, a reducible metal oxide or a mixture thereof.

When the metal oxide support comprises a non-reducible metal oxide, the non-reducible metal oxide may be selected from alumina, silica-alumina, zirconia, a zeolite and a mixture, composite oxide or mixed oxide of any two or more thereof. These are conventional non-reducible metal oxides that are commonly available in the art.

The non-reducible oxide can, typically, be doped, such as with a basic metal. Typically, the non-reducible metal oxide is doped with 1 to 10% by weight of a basic metal.

Generally, the basic metal may be selected from zirconium, lanthanum, aluminium, yttrium, praseodymium, cerium, barium and neodymium. The metal of the non-reducible metal oxide and the basic metal are preferably different.

When the support comprises a reducible metal oxide, then the reducible metal oxide may be selected from an oxide of manganese, an oxide of iron, an oxide of tin, an oxide of copper, an oxide of cobalt, an oxide of titanium and an oxide of cerium. Preferably, the reducible metal oxide is an oxide of iron and/or an oxide of cerium. More preferably, the reducible metal oxide is ceria.

Reducible oxides are versatile solid state compounds that exhibit a rich chemistry related to changes in the oxidation state of the metal. For example, $CeO_2$ is able to undergo rapid and reversible $Ce^{4+}/Ce^{3+}$ redox cycles depending on the conditions in the exhaust gas emission stream. When there is a shortage of oxygen, $CeO_2$ is reduced by reacting with CO to form $Ce_2O_3$. When there is an oxygen surplus $Ce_2O_3$ is oxidised to $CeO_2$. Such reducible metal oxides can also act as promoter for the supported catalyst system, either alongside the conventional supports or they can have dual activity as support and promoter.

Examples of reducible metal oxides include oxides of manganese ($MnO_2$ and $Mn_2O_3$), iron ($Fe_2O_3$), tin ($SnO_2$), copper (CuO), cobalt (CoO and $Co_2O_3$), titanium ($TiO_2$) and cerium ($CeO_2$). Preferred examples of reducible oxides include $Fe_2O_3$ and $CeO_2$, with $CeO_2$ being particularly preferred.

The support may comprise a reducible oxide in combination with a stabiliser or a reducible oxide in combination with a refractory oxide as a composite or mixed oxide.

Examples of refractory oxides include alumina, magnesia, silica-alumina and zirconia.

The term composite oxide as used herein refers to an amorphous oxide material comprising oxides of at least two elements, such as two metallic elements. A composite oxide is not a mixed oxide of two or more oxide compounds.

Examples of combinations of a reducible oxide with a refractory oxide include manganese oxide with zirconia, and ceria with zirconia. The molar ratio of zirconia to manganese oxide or ceria is preferably 10:1 to 1:10.

When the reducible oxide is in combination with a refractory oxide as a composite or mixed oxide, then preferably the ratio by weight of reducible oxide to refractory oxide is from 3:1 to 1:3.

The reducible metal oxide may also act as a catalyst promoter as well as a support. Thus, the reducible metal oxide can be dispersed on the non-reducible metal oxide, especially when the non-reducible metal oxide is in a particulate form.

It is generally preferred that the support comprises alumina, silica-alumina, ceria, titania, zirconia or ceria-zirconia. More preferably, the support comprises alumina, silica-alumina or ceria. The support may comprise alumina. The support may comprise silica-alumina.

Typically, the oxidation catalyst comprises ceria (e.g. as either a support or as a catalyst promoter), preferably particulate ceria, wherein the gold and/or the second metal is supported on the ceria. When the ceria is a catalyst promoter, then it may be supported on a support, preferably a support comprising a non-reducible metal oxide, a reducible metal oxide or a mixture thereof, such as a non-reducible metal oxide or a reducible metal oxide as defined above. It is preferred that the reducible metal oxide (i.e. for supporting the ceria) is not ceria. More preferably, the support comprises or consists of alumina. Thus, the oxidation catalyst comprises a metal oxide support, which comprises a mixed oxide of particulate ceria with alumina or a composite oxide of particulate ceria with alumina.

In general, the support has a $d_{90}$ particle size of ≤20 μm (as by conventional laser diffraction techniques). Preferably, the support has a mean particle size of up to 50 nm, and optionally in the range of 1 to 25 nm (as measured by transmission electron microscopy).

The invention further provides a catalytic convertor comprising a substrate monolith coated with the oxidation catalyst composition. Typically, the substrate monolith is a flow-through monolith or a filtering monolith.

In general, the catalytic convertor of the invention is for use as an oxidation catalyst, particularly a diesel oxidation catalyst (DOC), or a catalysed soot filter (CSF). In practice, catalyst formulations employed in DOCs and CSFs are similar. Generally, however, a principle difference between a DOC and a CSF is the substrate monolith onto which the oxidation catalyst composition is coated.

A flow-through monolith typically comprises a honeycomb monolith (e.g. a metal or ceramic honeycomb monolith) having a plurality of channels extending therethrough, which channels are open at both ends. When the substrate is a flow-through monolith, then the catalytic convertor of the invention is typically an oxidation catalyst, particularly a DOC, or is for use as an oxidation catalyst, such as a DOC.

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure. When the substrate is a filtering monolith, then the catalytic convertor of the invention is typically a catalysed soot filter (CSF) or is for use as a catalysed soot filter (CSF).

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channel and the outlet channels have a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate monolith may be of any shape or size. However, the shape and size of the substrate monolith is usually selected to optimise exposure of the catalytically active materials in the catalyst to the exhaust gas. The substrate monolith may, for example, have a tubular, fibrous or particulate form. Examples of suitable supporting substrate monoliths include a honeycomb cordierite monolith, honeycomb SiC monolith, a layered fibre or knitted fabric monolith, a foam monolith, a crossflow monolith, a metal wire mesh monolith, a metal porous body monolith and a ceramic particle monolith.

A further aspect of the invention relates to an exhaust gas emission treatment system for a lean burn combustion engine, which system comprises the catalytic convertor. In another aspect, the invention provides an apparatus comprising a lean burn combustion engine and the exhaust gas emission treatment system.

Lean burn refers to the use of lean mixtures in both a gasoline and diesel (compression-ignition) fuel powered internal combustion engine. The engine fuel can also include at least some biodiesel, bioethanol, components derived from a gas-to-liquid process, liquid petroleum gas or natural gas. The engine may be used in a mobile application, such as a vehicle, or a stationary application, such as a power generation unit. It is preferred that the lean burn combustion engine is a compression ignition engine, such as a diesel engine.

Typically, the exhaust gas emission treatment system may further comprise, or the catalytic convertor is for use in combination with, at least one emissions control device. The emissions control device may be selected from a diesel particulate filter (DPF), a $NO_x$ adsorber catalyst (NAC), a lean $NO_x$ catalyst (LNC), a selective catalytic reduction (SCR) catalyst, a diesel oxidation catalyst (DOC), a catalysed soot filter (CSF), a selective catalytic reduction filter (SCRF) catalyst, and combinations of two or more thereof. Emissions control devices represented by the terms diesel particulate filters (DPFs), $NO_x$ adsorber catalysts (NACs), lean $NO_x$ catalysts (LNCs), selective catalytic reduction (SCR) catalysts, diesel oxidation catalyst (DOCs), catalysed soot filters (CSFs) and selective catalytic reduction filter (SCRF) catalysts are all well known in the art.

Generally, the catalytic convertor is for use as a diesel oxidation catalyst (DOC) or a catalysed soot filter (CSF).

Examples of emissions control devices for use with the catalytic convertor of the invention or for inclusion in the exhaust gas emission treatment system of the invention are provided below.

The diesel particulate particulate filter preferably comprises a substrate monolith, wherein the substrate monolith is a filtering monolith or a flow-through monolith as defined above, preferably a filtering monolith. The substrate monolith may be coated with a catalyst formulation.

The catalyst formulation of the diesel particulate file may be suitable for oxidising (i) particulate matter (PM) and/or (ii) carbon monoxide (CO) and hydrocarbons (HCs). When the catalyst formulation is suitable for oxidising PM, then the resulting emissions control device is known as a catalysed soot filter (CSF). Typically, the catalyst formulation comprises platinum and/or palladium.

The catalyst formulation of the diesel particulate filter may be a $NO_x$ adsorber composition. When the catalyst formulation is a $NO_x$ adsorber composition, the emissions control device is an example of a $NO_x$ adsorber catalyst (NAC). Emissions control devices where the catalyst formulation is a $NO_x$ adsorber composition have been described (see, for example, EP 0766993). $NO_x$ adsorber compositions are well known in the art (see, for example, EP 0766993 and U.S. Pat. No. 5,473,887). $NO_x$ adsorber compositions are designed to adsorb $NO_x$ from lean exhaust gas (lambda >1) and to desorb the $NO_x$ when the oxygen concentration in the exhaust gas is decreased. Desorbed $NO_x$ may then be reduced to $N_2$ with a suitable reductant (e.g. engine fuel) and promoted by a catalyst component, such as rhodium, of the $NO_x$ adsorber composition itself or located downstream of the $NO_x$ adsorber composition.

Generally, a $NO_x$ adsorber composition comprises an alkali metal component, an alkaline earth metal component or a rare earth metal component or a combination of two or more components thereof, wherein the rare earth metal component comprises lanthanum or yttrium. It is preferred that the alkali metal component comprises potassium or sodium, more preferably potassium. It is preferred that the alkaline earth metal component comprises barium or strontium, more preferably barium.

The $NO_x$ adsorber composition may further comprise a support material and/or a catalytic metal component. The support material may be selected from alumina, ceria, titania, zirconia and mixtures thereof. The catalytic metal component may comprise a metal selected from platinum (Pt), palladium (Pd), rhodium (Rh) and combinations of two or more thereof.

Lean $NO_x$ catalysts (LNCs) are well known in the art. Preferred lean $NO_x$ catalysts (LNC) comprises either (a) platinum (Pt) supported on alumina or (b) a copper exchanged zeolite, particularly copper exchanged ZSM-5.

SCR catalysts are also well known in the art. When the exhaust system of the invention comprises an SCR catalyst, then the exhaust system may further comprise an injector for injecting a nitrogenous reductant, such as ammonia or urea, into exhaust gas downstream of the catalyst for oxidising carbon monoxide (CO) and hydrocarbons (HCs) and upstream of the SCR catalyst. Alternatively or in addition to the injector, the exhaust system may further comprise an engine management means for enriching the exhaust gas with hydrocarbons. The SCR catalyst can then use the hydrocarbons as a reductant to reduce $NO_x$. When the substrate of the SCR catalyst is a filtering monolith, then the catalyst is an SCRF catalyst.

In a first the exhaust gas emission treatment system embodiment, the system comprises the catalytic convertor of the invention, preferably as a DOC, and a catalysed soot filter (CSF). Such an arrangement may be called a DOC/CSF. This embodiment also relates to the use of the catalytic convertor for treating an exhaust gas from a lean burn combustion engine in combination with a catalysed soot filter, preferably wherein the catalytic convertor is, or is for use as, a diesel oxidation catalyst. The catalytic convertor is typically followed by (e.g. is upstream of) the catalysed soot filter (CSF). Thus, for example, an outlet of the catalytic convertor is connected to an inlet of the catalysed soot filter.

The first exhaust gas emission treatment system embodiment may further comprise a lean $NO_x$ catalyst (LNC). Thus, the embodiment further relates to the use of the catalytic convertor for treating an exhaust gas from a lean burn combustion engine in combination with a lean $NO_x$ catalyst (LNC) and a catalysed soot filter (CSF), preferably wherein the catalytic convertor is, or is for use as, a diesel oxidation catalyst. Typically the catalytic convertor is followed by (e.g. is upstream of) the lean $NO_x$ catalyst (LNC), and the lean $NO_x$ catalyst (LNC) is followed by (e.g. is upstream of) the catalysed soot filter (CSF). Generally, the catalytic convertor, the lean $NO_x$ catalyst (LNC) and the catalysed soot filter (CSF) are connected in series. Thus, for example, an outlet of the catalytic convertor is connected to an inlet of the lean $NO_x$ catalyst (LNC), and an outlet of the lean $NO_x$ catalyst (LNC) is connected to an inlet of the catalysed soot filter (CSF). Such an arrangement may be termed a DOC/LNC/CSF.

In a second exhaust gas emission treatment system embodiment, the system comprises a diesel oxidation catalyst and the catalytic convertor of the invention, preferably as a catalysed soot filter (CSF). This arrangement may also be called a DOC/CSF arrangement. The embodiment further relates to the use of the catalytic convertor for treating an exhaust gas from a lean burn combustion engine in combination with a diesel oxidation catalyst (DOC), preferably wherein the catalytic convertor is, or is for use as, a catalysed soot filter. Typically, the diesel oxidation catalyst (DOC) is followed by (e.g. is upstream of) the catalytic convertor of the invention. Thus, an outlet of the diesel oxidation catalyst is connected to an inlet of the catalytic convertor of the invention.

A third exhaust gas emission treatment system embodiment relates to a system comprising the catalytic convertor of the invention, preferably as a DOC, a catalysed soot filter (CSF) and a selective catalytic reduction (SCR) catalyst. Such an arrangement may be called a DOC/CSF/SCR and is a preferred exhaust gas emission treatment system for a light-duty diesel vehicle. This embodiment also relates to the use of the catalytic convertor for treating an exhaust gas from a lean burn combustion engine in combination with a catalysed soot filter (CSF) and a selective catalytic reduction (SCR) catalyst, preferably wherein the catalytic convertor is, or is for use as, a diesel oxidation catalyst. The catalytic convertor is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

A fourth exhaust gas emission treatment system embodiment relates to a system comprising a diesel oxidation catalyst (DOC), the catalytic convertor of the invention, preferably as a catalysed soot filter (CSF), and a selective catalytic reduction (SCR) catalyst. This is also a DOC/CSF/SCR arrangement. A further aspect of this embodiment relates to the use of the catalytic convertor for treating an exhaust gas from a lean burn combustion engine in combination with a diesel oxidation catalyst (DOC) and a selective catalytic reduction (SCR) catalyst, preferably wherein the catalytic convertor is, or is for use as, a catalysed soot filter (CSF). The diesel oxidation catalyst (DOC) is typically followed by (e.g.

is upstream of) the oxidation catalyst of the invention. The catalytic convertor of the invention is typically followed by (e.g. is upstream of) the selective catalytic reduction (SCR) catalyst. A nitrogenous reductant injector may be arranged between the catalytic convertor and the selective catalytic reduction (SCR) catalyst.

Thus, the catalytic convertor may be followed by (e.g. is upstream of) a nitrogenous reductant injector, and the nitrogenous reductant injector may be followed by (e.g. is upstream of) the selective catalytic reduction (SCR) catalyst.

In a fifth exhaust gas emission treatment system embodiment, the system comprises the catalytic convertor of the invention, preferably as a DOC, a selective catalytic reduction (SCR) catalyst and either a catalysed soot filter (CSF) or a diesel particulate filter (DPF). The arrangement is either a DOC/SCR/CSF or a DOC/SCR/DPF. This embodiment also relates to the use of the catalytic convertor for treating an exhaust gas from a lean burn combustion engine in combination with a selective catalytic reduction (SCR) catalyst and either a catalysed soot filter (CSF) or a diesel particulate filter (DPF), preferably wherein the catalytic convertor is, or is for use as, a diesel oxidation catalyst.

In the fifth exhaust system embodiment, the catalytic convertor of the invention is typically followed by (e.g. is upstream of) the selective catalytic reduction (SCR) catalyst. A nitrogenous reductant injector may be arranged between the catalytic convertor and the selective catalytic reduction (SCR) catalyst. Thus, the catalytic convertor may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A sixth exhaust gas emission treatment system embodiment comprises the catalytic convertor of the invention, preferably as a DOC, and a selective catalytic reduction filter (SCRF) catalyst. Such an arrangement may be called a DOC/SCRF. This embodiment also relates to the use of the catalytic convertor for treating an exhaust gas from a lean burn combustion engine in combination with a selective catalytic reduction filter (SCRF) catalyst, preferably wherein the catalytic convertor is, or is for use as, a diesel oxidation catalyst. The catalytic convertor of the invention is typically followed by (e.g. is upstream of) the selective catalytic reduction filter (SCRF) catalyst. A nitrogenous reductant injector may be arranged between the catalytic convertor and the selective catalytic reduction filter (SCRF) catalyst. Thus, the catalytic convertor may be followed by (e.g. is upstream of) a nitrogenous reductant injector, and the nitrogenous reductant injector may be followed by (e.g. is upstream of) the selective catalytic reduction filter (SCRF) catalyst.

In a seventh exhaust gas emission treatment system embodiment, the system comprises a lean $NO_x$ catalyst (LNC) and the catalytic convertor of the invention, preferably as a catalysed soot filter (CSF). This arrangement may also be called a LNC/CSF arrangement. The embodiment further relates to the use of the catalytic convertor for treating an exhaust gas from a lean burn combustion engine in combination with a lean $NO_x$ catalyst (LNC), preferably wherein the catalytic convertor is, or is for use as, a catalysed soot filter. Typically, the catalysed soot filter (CSF) is downstream of the lean $NO_x$ catalyst (LNC) Thus, an outlet of the lean $NO_x$ catalyst (LNC) is connected to an inlet of the catalytic convertor of the invention.

The seventh exhaust gas emission treatment system embodiment may further comprise a selective catalytic reduction (SCR) catalyst. Thus, the embodiment further relates to the use of the catalytic convertor for treating an exhaust gas from a lean burn combustion engine in combination with a lean $NO_x$ catalyst (LNC) and a selective catalytic reduction (SCR) catalyst, preferably wherein the catalytic convertor is, or is for use as, a catalysed soot filter (CSF). Typically the lean $NO_x$ catalyst (LNC) is followed by (e.g. is upstream of) the catalytic convertor of the invention, and the catalytic convertor of the invention is followed by (e.g. is upstream of) the selective catalytic reduction (SCR) catalyst. Such an arrangement may be termed a LNC/CSF/SCR. A nitrogenous reductant injector may be arranged between the catalytic convertor and the selective catalytic reduction (SCR) catalyst. Thus, the catalytic convertor may be followed by (e.g. is upstream of) a nitrogenous reductant injector, and the nitrogenous reductant injector may be followed by (e.g. is upstream of) the selective catalytic reduction (SCR) catalyst.

In the seventh exhaust gas emission treatment system embodiment with an SCR catalyst, the lean $NO_x$ catalyst (LNC), the catalytic convertor and the selective catalytic reduction (SCR) catalyst are generally connected in series with an optional nitrogenous reductant injector being connected between the catalytic convertor and the selective catalytic reduction (SCR) catalyst. Thus, for example, an outlet of the lean $NO_x$ catalyst (LNC) is connected to an inlet of the catalytic convertor, and outlet of the catalytic convertor is connected to an inlet of the selective catalytic reduction (SCR) catalyst.

The invention also provides a vehicle comprising an apparatus of the invention, and wherein the lean burn combustion engine is a lean burn internal combustion engine. The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

It is preferred that the vehicle is a light-duty diesel vehicle.

The oxidation catalyst composition of the invention can be prepared by a variety of techniques.

The invention further relates to a process for preparing an oxidation catalyst composition comprising (a) preparing a first solution comprising gold, (b) preparing a second solution comprising a second metal selected from the group consisting of platinum, rhodium, ruthenium, copper and nickel, and (c) applying the first solution and the second solution (e.g. simultaneously, concurrently, separately, or sequentially) to a support.

In general, the first solution is a solution comprising a salt of gold. The second solution is generally a solution comprising a salt of the second metal, namely a salt of platinum, rhodium, ruthenium, copper or nickel.

An embodiment of the process for preparing an oxidation catalyst composition relates to an impregnation process. The impregnation process comprises: (a) preparing an aqueous salt solution comprising gold and a second metal selected from the group consisting of platinum, rhodium, ruthenium, copper and nickel; and (b) adding, typically stepwise, the aqueous salt solution to a support to form the oxidation catalyst composition.

Impregnation processes for preparing catalyst compositions are well-known in the art. For example, the oxidation catalyst composition can be prepared by incipient wetness impregnation, such as disclosed in GB2122912 A. Solutions of metal salts and gold salts are typically added in a single step to the support. The resulting composition is then dried in air and calcined at 500° C.

An alternative embodiment of the process for preparing an oxidation catalyst composition comprises: (a) preparing a solution of a soluble base; (b) preparing a mixed solution of a support precursor and a solution comprising gold and a second metal selected from the group consisting of platinum, rhodium, ruthenium, copper and nickel; (c) adding, typically dropwise, the mixed solution to the solution of a soluble base under reflux to form a co-precipitate of an oxidation catalyst composition.

A further embodiment of the process for preparing an oxidation catalyst composition of the invention comprises: (a) preparing a solution of a support in a soluble base; (b) preparing a mixed solution of a support precursor for a second support and a solution comprising gold and a second metal selected from the group consisting of platinum, rhodium, ruthenium, copper and nickel; (c) adding, typically dropwise, the mixed solution to the solution of a support in a soluble base under reflux to form a precipitate of an oxidation catalyst composition.

Another embodiment of the process for preparing an oxidation catalyst composition of the invention comprises: (a) preparing a solution of a support in a soluble base; (b) preparing a mixed solution comprising gold and a second metal selected from platinum, rhodium, ruthenium, copper and nickel; (c) preparing an aqueous solution of a support precursor for a second support; (d) adding the mixed solution to the solution of a support in a soluble base under reflux to form an intermediate solution; (e) adding, typically dropwise, the aqueous solution of a support precursor for a second support to the intermediate solution under reflux to form a precipitate of an oxidation catalyst composition.

A further embodiment relates to a deposition/precipitation process for preparing an oxidation catalyst composition of the invention. The process comprises: (a) preparing a mixed salt solution comprising gold and a second metal selected from the group consisting of platinum, rhodium, ruthenium, copper and nickel salts; (b) preparing an aqueous slurry of at least one support; (c) depositing the mixed salt solution on to the aqueous slurry at a pH controlled to be from 6 to 8, such as by using a basic salt, to form a precipitate of an oxidation catalyst composition. Typically, the precipitate is washed, dried and calcined.

In embodiments where there is both a support and a second support, then the support and the second support can be the same or are different.

In processes involving a soluble base, it is possible to use any soluble base, which is typically used as a precipitant. Typically, the soluble base is selected from NaOH, KOH, $NH_4OH$ and an organic base. Preferably, the soluble base is NaOH.

Generally, precipitation of the metal oxide support can be brought about by reaction of a solution of the soluble base and a solution of a metal oxide support precursor. The metal oxide support precursor can be any soluble salt which can be converted by this reaction to the metal oxide present in the support. When the metal oxide support in the oxidation catalyst composition includes a refractory metal oxide as discussed above, the refractory metal oxide can be incorporated by co-precipitation.

Precipitation of the gold and second metal can be brought about by reaction of a solution of the soluble base and a solution of salt of gold and a salt of the second metal. For example, a mixture of a salt of gold, a salt of the second metal and a metal oxide support precursor are dissolved in water and added dropwise to a soluble base to form a co-precipitate.

Gold and the second metal may be co-precipitated from a colloid comprising gold and the second metal. The colloid can be pre-formed. The colloid can be formed in situ by using a reducing agent. The reducing agent can, for instance, be formaldehyde or sodium formate.

In a particular technique, co-precipitation is effected by admixing the colloid, a solution of a metal oxide support precursor, and a base.

Metal particles can be co-precipitated by reduction of a hydrolysed salt of gold and a salt of the second metal. Convenient soluble salts of the second metal include chloroplatinic acid, tetraamine platinum hydroxide or tetraamine platinous chloride.

In a co-precipitation process, a solution of metal oxide support precursor, gold and the second metal is preferably added to a solution of a base, so that co-precipitation occurs at a basic pH, rather than an acidic pH. It has been found that this preferred order of addition tends to result in an oxidation catalyst composition having a high surface area, particularly when the metal oxide is ceria.

It is to be understood that co-precipitation may produce a precipitate where the metal oxide support is present in a form other than an oxide, such as a hydroxide. This other form can then be converted to the metal oxide, for example by heating.

The process of the invention may include a step of heating a precipitate at 50 to 500° C.

An oxidation catalyst composition of the invention may be prepared by co-precipitation, as described above, in the presence of a second metal oxide support. The second metal oxide support may be the same or different to the metal oxide support. Preferably, the second metal oxide support is the same as the metal oxide support.

In a further embodiment the catalyst compositions of the invention are prepared by addition of salts or hydrolysed salts or colloids of gold and metal chosen from platinum, rhodium, ruthenium, copper and nickel followed by addition of metal oxide support precursor to a second metal oxide support. As described above the second metal oxide support may be the same or different to the metal oxide support. In a preferred embodiment the second metal oxide support is the same as the metal oxide support.

The invention further provides a method of treating carbon monoxide (CO), and optionally hydrocarbons (HCs) and/or nitrogen oxides ($NO_x$), in an exhaust gas from a lean burn combustion engine, which method comprises passing the exhaust gas over an oxidation catalyst composition of the invention, or through a catalytic convertor or an exhaust gas emission treatment system of the invention.

A further aspect of the invention relates to the use of an oxidation catalyst composition or a catalytic convertor of the invention for treating carbon monoxide (CO), and optionally hydrocarbons (HCs) and/or nitrogen oxides ($NO_x$), in an exhaust gas from a lean burn combustion engine.

A typical direct injection light duty diesel engine produces about 1000 ppm CO and 900 ppm HC when the engine is idling at an exhaust gas emission temperature of about 185° C. Conventional direct injection diesel engines can produce exhaust gas emissions comprising up to and greater than 2000 ppm carbon monoxide at cold start and also during hard acceleration. The catalytic convertor of the invention is effective in converting these high levels of CO when present in the exhaust gas emissions.

The catalytic convertor of the invention is thermally stable such that the conversion of CO and HC is not adversely affected as the oxidation catalyst composition ages. The oxidation catalyst of the invention is tolerant to sulphation and desulphation processes. Desulphation can be readily achieved by contacting the oxidation catalyst composition with an exhaust gas at an elevated temperature, which is typically lower than the temperature required for a monometallic catalyst. Furthermore the conversion of CO and HC is not adversely affected by repeated sulphation and desulphation.

EXAMPLES

The present invention will now be described with reference to the accompanying Examples. It should be noted that the Examples are provided by way of illustration only.

Example 1

Preparation of Oxidation Catalyst Compositions According to the Invention

Method 1(a): 1% Pt0.5% Au/$CeO_2$ Prepared by Co-Precipitation of Au and Pt Salts with a Ceria Precursor in Presence of Ceria NaOH (2.0 g, 0.045 mol) was dissolved in water (550 ml) in a 1 L 3 neck flask fitted with condenser, magnetic stirrer bar and dropping funnel. Ceria (7.5 g) was added. The solution was stirred and heated to reflux. $Ce(NO_3)_3 6H_2O$ (6.3 g, 0.0145 mol) was dissolved in water (30 ml) and $HAuCl_4$ (0.1 g, 49.96% Au) solid and $H_2PtCl_6$ (0.4 g, 25.06% Pt) solution were added to form a mixed salt solution. The mixed salt solution was added over ca. 10 mins to the ceria in NaOH. The precipitate slurry formed was stirred and refluxed for a further 40 mins.

The catalyst was collected by filtration and washed until the conductivity was less than 10 µS.

The material was dried at 105° C., yield=9.77 g. The sample was then fired at 400° C. in air for 2 hr (ramp up 10° C.) yield=9.54 g.

Method 1(b): 1% Pt0.5% Au/$CeO_2$ Prepared by Sequential Addition of Au and Pt Salts Followed by Ceria Precursor to Ceria NaOH (2.0 g, 0.045 mol) was dissolved in water (550 ml) in a 1 L 3 neck flask fitted with condenser, magnetic stirrer bar and dropping funnel. Ceria (7.5 g) was added. The solution was stirred and heated to reflux. $HAuCl_4$ (0.1 g, 49.96% Au) was dissolved in water (40 ml) and $H_2PtCl_6$ (0.4 g, 25.06% Pt) solution was added to form a mixed salt solution. The mixed salt solution was added over ca. 5 mins to the ceria in NaOH to form a further solution. After 30 min reflux $Ce(NO_3)_3 6H_2O$ (6.3 g, 0.0145 mol) was dissolved in water (30 ml) and added drop wise to the further solution over a couple of mins. The precipitate slurry that was formed was stirred and refluxed for a further 30 mins. The catalyst was collected by filtration and washed until the conductivity was ca. 10 µS.

The material was dried at 105° C., yield=9.83 g. The sample was then fired at 400° C. in air for 2 hr (ramp up 10° C.) yield=9.62 g.

Example 2

Preparation of Comparative Catalyst Compositions Pt—$CeO_2$, Prepared by a Co-Precipitation Method 50 g of Pt—$CeO_2$ with a nominal loading of 0.9 wt % Pt was prepared using $Ce(NO_3)_3.6H_2O$ (126 g), chloroplatinic acid (CPA) (1.148 g) and solid NaOH (36 g). The NaOH was dissolved in 6 liters of de-ionised water and brought to the boil. The CPA and $Ce(NO_3)_3$ were dissolved in water and made up to 500 cm$^3$. The resulting solution was added dropwise to the boiling NaOH solution and produced a black precipitate. The precipitate was then boiled for an hour, filtered and washed to remove $NO_3^-$, $Cl^-$ and $Na^+$. The washed precipitate was dried at 110° C. and then calcined in air at 500° C.

Example 3

Testing Conditions

Catalyst compositions were tested in a simulated catalyst activity testing (SCAT) gas rig using the following inlet gas mixtures to mimic emissions from diesel exhausts.

a) Lean light off and passivation by exposure of a 0.4 g sample to 1000 ppm CO, 900 ppm propene, 200 ppm NO, 12% $O_2$, 4.5% $CO_2$, 4.5% $H_2O$, balance $N_2$ at a flow rate of 2 L/min for 2 mins.

b) Rich activation by exposure of a 0.4 g sample to 3% CO, 900 ppm propene, 200 ppm NO, 0.75% $O_2$, 4.5% $CO_2$, 4.5% $H_2O$, balance $N_2$ at a flow rate of 2 L/min for 30 secs.

Example 4

Results of Catalyst Composition Testing

Table 1 below illustrates temperatures for 50% and 90% conversion of CO for fresh catalyst composition prepared according to the invention and comparative catalyst tested under lean light off and passivation conditions (ramp 1) and rich activation conditions (ramp 2).

TABLE 1

| Catalyst Composition | Temp for 50% CO conversion (ramp 1) (° C.) | Temp for 90% CO conversion (ramp 1) (° C.) | Temp for 90% CO conversion (ramp 2) (° C.) |
| --- | --- | --- | --- |
| Method 1(a) | 144 | 174 | 168 |
| Method 1(b) | 132 | 180 | <115* |
| Comparative-Example 2 | 147 | 202 | 178 |

*100% conversion was observed at beginning of test at about 115° C.

Table 1 clearly shows that the fresh oxidation catalyst composition according to the invention provides high % CO conversion at low light off temperatures for supported bimetallic catalysts as compared to monometallic catalysts for both lean light off and passivation and rich activation. The addition of gold to Pt-ceria has enhanced the metallic properties of the Pt.

The CO light off temperatures of oxidation catalyst compositions of the invention were measured in a flowing gas mixture having the above named concentrations of CO and HC in a simulated catalyst activity test (SCAT) gas rig. The oxidation catalyst compositions of the invention (tested in the SCAT gas rig) preferably have CO light off (temperature at 50% CO conversion) of less than 150° C. For 90% CO conversion, the light off temperature is preferably less than 190° C.

Oxidation catalyst compositions of the invention were tested for CO light off under rich activation conditions, i.e. exposure to 3% CO and 900 ppm HC for 30 secs, in a simulated catalyst activity test (SCAT) gas rig. The oxidation catalyst compositions of the invention tested under these conditions preferably have CO light off temperature at 90% CO conversion of less than 170° C.

For the avoidance of any doubt, the entire content of any and all documents cited herein is incorporated by reference into the present application.

The invention claimed is:

1. An oxidation catalyst composition for controlling emissions, which composition comprises a support and a bimetallic catalyst consisting of gold and platinum, wherein the bimetallic catalyst is supported on the support, and wherein the support comprises a reducible metal oxide, which is an oxide of cerium.

2. An oxidation catalyst composition according to claim 1 wherein the atomic ratio of platinum to gold is from 100:1 to 1:100.

3. An oxidation catalyst composition according to claim 2 wherein the atomic ratio of platinum to gold is from 95:5 to 5:95.

4. An oxidation catalyst composition according to claim 3 wherein the atomic ratio of platinum to gold is from 95:5 to 25:75.

5. An oxidation catalyst composition according to claim 1 wherein the oxidation catalyst composition comprises a total amount (in weight %) of platinum and gold of from 0.1 to 10%.

6. An oxidation catalyst composition according to claim 1 wherein the reducible metal oxide is ceria.

7. An oxidation catalyst composition according to claim 1 wherein the support comprises the reducible oxide in combination with a stabiliser or the reducible oxide in combination with a non-reducible metal oxide as a composite or mixed oxide.

8. An oxidation catalyst composition according to claim 1 wherein the metal oxide support comprises a mixed oxide of particulate ceria with alumina or a composite oxide of particulate ceria with alumina.

9. An oxidation catalyst composition according to claim 1 wherein the support has a particle size of up to 50 nm.

10. A catalytic convertor comprising a substrate monolith coated with the oxidation catalyst composition of claim 1.

11. An apparatus comprising a lean burn combustion engine and an exhaust gas emission treatment system for a lean burn combustion engine, which system comprises the catalytic convertor of claim 10.

12. A vehicle comprising the apparatus of claim 11, and wherein the lean burn combustion engine is a lean burn internal combustion engine.

13. A process for preparing the oxidation catalyst composition of claim 1, which process comprises:
    (a) preparing a first solution comprising gold;
    (b) preparing a second solution comprising platinum; and
    (c) applying the first solution and the second solution to a support, wherein the support comprises a reducible metal oxide which is an oxide of cerium.

14. A method of treating carbon monoxide (CO) in an exhaust gas from a lean burn combustion engine, which method comprises passing the exhaust gas over the oxidation catalyst composition of claim 1.

* * * * *